United States Patent
Rajagopal et al.

(10) Patent No.: US 9,906,504 B2
(45) Date of Patent: *Feb. 27, 2018

(54) HARDWARE-TRUSTED ORTHOGONAL FREQUENCY DIVISION MULTIPLEX (OFDM) ACCESS TO A SHARED COMMON PUBLIC RADIO INTERFACE (CPRI)

(71) Applicant: Sprint Communications Company L.P., Overland Park, KS (US)

(72) Inventors: Arun Rajagopal, Leawood, KS (US); Lyle Walter Paczkowski, Mission Hills, KS (US); Roger Danforth Bartlett, Merriam, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,471

(22) Filed: Mar. 30, 2017

(65) Prior Publication Data

US 2017/0208046 A1   Jul. 20, 2017

Related U.S. Application Data

(63) Continuation of application No. 14/834,003, filed on Aug. 24, 2015, now Pat. No. 9,648,617.

(51) Int. Cl.
*H04W 72/04* (2009.01)
*H04L 29/06* (2006.01)
*H04L 5/00* (2006.01)

(52) U.S. Cl.
CPC ........ *H04L 63/0428* (2013.01); *H04L 5/0007* (2013.01); *H04W 72/044* (2013.01)

(58) Field of Classification Search
None
See application file for complete search history.

(56) References Cited

U.S. PATENT DOCUMENTS 8,176,525 B2   5/2012   Koehler, Jr. et al.
8,200,827 B1   6/2012   Hunyady et al.
(Continued)

OTHER PUBLICATIONS

Gabriel Brown; "Converging Telecom & IT in the LTR RAN;" White Paper; Feb. 2013; pp. 1-12; www.heavyreading.com.
(Continued)

*Primary Examiner* — Mohammad Adhami

(57) ABSTRACT

An Orthogonal Frequency Division Multiplex (OFDM) data communication system comprises OFDM subsystems. A trusted OFDM subsystem receives trust challenge data and encodes the trust challenge data with a physically-embedded read-only trust key to generate encoded trust data. The trusted OFDM subsystem transfers the encoded trust data. The trusted OFDM subsystem receives user data into a trusted network receive buffer system and transfers a resource request to an access OFDM subsystem. The access OFDM subsystem receives the resource request and allocates and indicates trusted OFDM resource blocks to the trusted OFDM subsystem. The trusted OFDM subsystem schedules the user data using the trusted OFDM resource blocks and transfers the user data from the trusted network receive buffer system to a trusted Common Public Radio Interface (CPRI) transmit buffer system. The trusted OFDM subsystem transfers the user data from the trusted CPRI transmit buffer system to a CPRI communication system.

20 Claims, 6 Drawing Sheets

(56) References Cited

U.S. PATENT DOCUMENTS

| | | | |
|---|---|---|---|
| 8,635,693 | B2 | 1/2014 | Ormazabal et al. |
| 8,649,770 | B1 | 2/2014 | Cope et al. |
| 8,667,607 | B2 | 3/2014 | Paczkowski et al. |
| 8,705,518 | B1 | 4/2014 | Afshar et al. |
| 8,743,870 | B2 | 6/2014 | Ramachandran et al. |
| 8,752,140 | B1 | 6/2014 | Paczkowski et al. |
| 8,930,693 | B2 | 1/2015 | Holt et al. |
| 2006/0182130 | A1 | 8/2006 | Even et al. |
| 2007/0147380 | A1 | 6/2007 | Ormazabal et al. |
| 2010/0323714 | A1* | 12/2010 | Schmidt ............... H04W 48/18 455/456.1 |
| 2012/0039185 | A1 | 2/2012 | Chen |
| 2013/0080771 | A1* | 3/2013 | Brickell ............... H04L 9/0833 713/158 |
| 2013/0110920 | A1 | 5/2013 | Broustis et al. |
| 2014/0045450 | A1 | 2/2014 | Ballantyne et al. |
| 2014/0122820 | A1 | 5/2014 | Park et al. |
| 2014/0229945 | A1 | 8/2014 | Barkai et al. |
| 2015/0063166 | A1 | 3/2015 | Sif et al. |
| 2015/0180626 | A1* | 6/2015 | Hao ...................... H04L 5/0044 370/329 |
| 2015/0215309 | A1* | 7/2015 | Aigner ................ H04L 63/0853 726/4 |
| 2015/0223060 | A1* | 8/2015 | Chiang ................ H04W 92/12 380/247 |
| 2015/0282228 | A1* | 10/2015 | Schmidt ............. H04W 76/023 455/426.1 |
| 2016/0014799 | A1* | 1/2016 | Aydin ............... H04W 72/1257 370/329 |

OTHER PUBLICATIONS

Shantanu Pathak, et al.; "Next Generation 4G WiMAX Networks—IEEE 802.16 Standard;" Computer Science & Information Technology; Oct. 31, 2012; pp. 507-518; DOI: 10.5121/csit.2012.2450; Department of Telecommunications, SRM University, Chennai, India.

"Common Public Radio Interface (CPRI); Interface Specification;" CPRI Specification V6.1; Jul. 1, 2014; pp. 1-129; Ericsson AB, Huawei Technologies Co. Ltd, NEC Corporation, Alcatel Lucent, and Nokia Networks.

"Trusted Platform Module Library Part 1: Architecture;" TCG Published; Oct. 30, 2014; pp. 1-253; Family "2.0" Level 00 Revision 01.16; TCG.

* cited by examiner

HARDWARE-TRUSTED ORTHOGONAL FREQUENCY DIVISION MULTIPLEX (OFDM) ACCESS TO A SHARED COMMON PUBLIC RADIO INTERFACE (CPRI)

RELATED CASES

This patent application is a continuation of U.S. patent application Ser. No. 14/834,003 that was filed on Aug. 24, 2015 and is entitled "HARDWARE-TRUSTED ORTHOGONAL FREQUENCY DIVISION MULTIPLEX (OFDM) ACCESS TO A SHARED COMMON PUBLIC RADIO INTERFACE (CPRI)." U.S. patent application Ser. No. 14/834,003 is hereby incorporated by reference in this patent application.

TECHNICAL BACKGROUND

Data communication systems provide various services like internet access, media conferencing, file access, user messaging, and content delivery. Orthogonal Frequency Division Multiplex (OFDM) access systems help support these data services. An exemplary OFDM access system might be a base station, baseband unit, hotspot, or eNodeB. The OFDM access system schedules its wireless user data exchanges in OFDM resource blocks. Based on the scheduling, the OFDM access system exchanges the user data with a Common Public Radio Interface (CPRI). The CPRI exchanges the user data with OFDM radios that wirelessly exchange the user data with User Equipment (UE) over the air. For example, a baseband unit on the ground uses CPRI to exchange data with the amplifiers/antennas that are mounted high-up on a cell tower.

The OFDM access systems execute networking software to forward data packets to support the data services. These OFDM systems use Network Function Virtualization Infrastructures (NFVIs) to execute their networking software. The NFVIs distribute the execution of the networking software across various processing cores, time cycles, memories, and I/O ports. The networking software comprises Virtual Network Functions (VNFs) like virtual baseband units and the like.

Some OFDM access systems obtain hardware trust based on their physically-embedded, read-only, secret keys. The hardware-trusted OFDM access systems receive trust challenge data and encode the trust challenge data with their secret keys. The trusted OFDM access systems transfer the encoded trust challenge data to a hardware trust validation system. The hardware trust validation system also has the trust challenge data and the secret keys to generate independent versions of the encoded trust challenge data for comparison and hardware trust validation.

Unfortunately, these OFDM access systems do not effectively integrate hardware-trusted systems into their standard systems. The OFDM access systems do not effectively use NFVI to perform the integration of hardware-trusted OFDM systems with standard OFDM systems. Moreover, these OFDM access systems do not effectively share CPRI systems between their hardware-trusted and standard subsystems.

TECHNICAL OVERVIEW

An Orthogonal Frequency Division Multiplex (OFDM) data communication system comprises OFDM subsystems. A trusted OFDM subsystem receives trust challenge data and encodes the trust challenge data with a physically-embedded read-only trust key to generate encoded trust data. The trusted OFDM subsystem transfers the encoded trust data. The trusted OFDM subsystem receives user data into a trusted network receive buffer system and transfers a resource request to an access OFDM subsystem. The access OFDM subsystem receives the resource request and allocates and indicates trusted OFDM resource blocks to the trusted OFDM subsystem. The trusted OFDM subsystem schedules the user data using the trusted OFDM resource blocks and transfers the user data from the trusted network receive buffer system to a trusted Common Public Radio Interface (CPRI) transmit buffer system. The trusted OFDM subsystem transfers the user data from the trusted CPRI transmit buffer system to a CPRI communication system.

DETAILED DESCRIPTION

Figure 1:
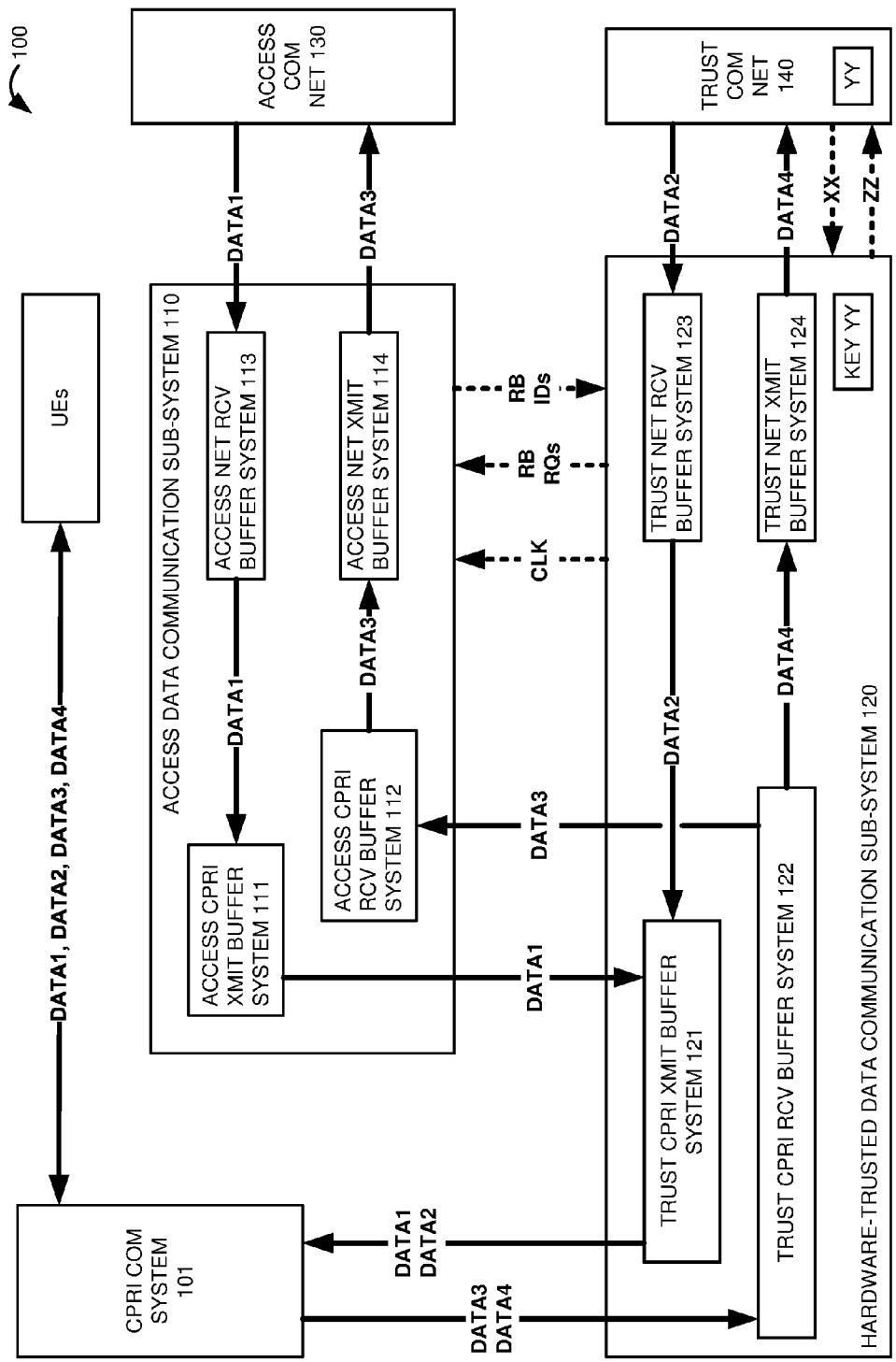
FIG. 1 illustrates Orthogonal Frequency Division Multiplex (OFDM) data communication access system to share a Common Public Radio Interface (CPRI) system between OFDM subsystems.

FIG. 1 illustrates Orthogonal Frequency Division Multiplex (OFDM) data communication access system 100 to share Common Public Radio Interface (CPRI) system 101 between OFDM subsystems 110 and 120. The data communications might be video conferencing, media streaming, Internet access, file transfers, or some other user data transfer. OFDM system 100 comprises CPRI communication system 101, access data communication subsystem 110, hardware-trusted data communication subsystem 120, access communication network 130, and trusted communication network 140. OFDM data communication access system 100 exchanges user data (data1, data2, data3, data4) between various User Equipment (UEs) and communication networks 130 and 140.

Data communication subsystems 110 and 120 could be base stations, eNodeBs, hotspots, picocells, or some other wireless access points that share CPRI communication system 101. In many examples, subsystems 110 and 120 are integrated within the same wireless access point. CPRI communication system 101 forms the communication interface between data subsystems 110 and 120 and the UEs. CPRI communication system 101 wirelessly exchanges data1, data2, data3, and data4 with the UEs over the air.

Access data communication subsystem 110 exchanges data1 and data3 between access communication network 130 and hardware-trusted subsystem 120. Access subsystem 110 receives Resource Block Requests (RB RQs) from hardware-trusted subsystem 120 and responsively allocates Resource Blocks (RBs) to trusted subsystem 120. Access subsystem 110 transfers Resource Block Identifiers (RB IDs) for the allocated and scheduled RBs to hardware-trusted subsystem 120. Access subsystem 110 also receives a clock signal (CLK) from hardware-trusted subsystem 120.

Hardware-trusted data communication subsystem 120 exchanges data2 and data4 between trusted communication network 140 and CPRI communication system 101. Hardware-trusted data communication subsystem 120 also exchanges data1 and data3 between access subsystem 110 and CPRI communication system 101. Hardware-trusted subsystem 120 transfers RB RQs to access subsystem 110 and receives RB IDs for reserved RBs from access subsystem 110. Hardware-trusted subsystem 120 transfers the CLK to access subsystem 110.

CPRI communication system 101 receives data1 and data2 from hardware-trusted data communication subsystem 120. CPRI communication system 101 transfers data3 and data4 to hardware-trusted data communication subsystem 120. CPRI communication system 101 wirelessly exchanges data1, data2, data3, and data4 over the air. CPRI communication system 101 comprises communication links, data memories, signal processors, modulators, filters, amplifiers, and antenna elements.

Data communication subsystems 110 and 120 comprise communication transceivers, Central Processing Units (CPUs), data memories, bus interfaces, software, and other server components. Access subsystem 110 comprises access CPRI Transmit (XMIT) buffer system 111, access CPRI Receive (RCV) buffer system 112, access Network (NET) RCV buffer system 113, access NET XMIT buffer system 114. Trusted subsystem 120 comprises trust CPRI XMIT buffer system 121, trust CPRI RCV buffer system 122, trust NET RCV buffer system 123, and trust NET XMIT buffer system 124. Buffer systems 111-114 and 121-124 comprise circuitry and software in the form of memory controllers, storage drives, bus interfaces, control software, and the like. Hardware-trusted data communication subsystem 120 further comprises physically-embedded read-only trust key YY. Trust key YY enables remote hardware trust validation of subsystem 120 by trusted communication network 140 or some other computer system.

Access communication network 130 and trusted communication network 140 comprise data communication machines, such as flow controllers, routers, gateways, controllers, databases, and/or some other network elements. Access communication network 130 exchanges data1 and data3 with access subsystem 110. Trusted communication network 140 exchanges data2 and data4 with hardware-trusted subsystem 120. Trusted communication network 140 stores a version of trust key YY for hardware trust validation of hardware-trusted subsystem 120.

In operation, hardware-trusted OFDM subsystem 120 receives trust challenge data XX from trusted communication network 140. Trusted subsystem 120 responsively encodes the trust challenge data XX with its own physically-embedded trust key YY to generate encoded trust data ZZ. For example, network 140 may transfer a random number "XX" to subsystem 120 which hashes the rand XX and the physical key YY through a one-way hash to generate the encoded data ZZ. Trusted communication network 140 processes the trust challenge data XX with its own version of trust key YY to generate the same encoded trust data ZZ. Trusted communication network 140 compares the encoded trust data ZZ from trusted subsystem 120 to its self-generated trust data ZZ to physically verify hardware-trust for subsystem 120. Numerous keys within hardware-trusted subsystem 120 may be used to verify the hardware integrity of the components of subsystem 120 like CPUs, memories, and transceivers.

Access OFDM subsystem 110 receives data1 from access communication network 130 into access NET RCV buffer system 113. Trusted OFDM subsystem 120 receives data2 from trusted communication network 140 into trust NET RCV buffer system 123. In response to data2, trusted subsystem 120 transfers an RB RQ to access subsystem 110. Access subsystem 110 receives the RB RQ and responsively retains a first set of OFDM RBs (RB1) to itself and allocates a second set of OFDM RBs (RB2) to trusted subsystem 120. RB1 and RB2 are mutually exclusive. Access subsystem 110 indicates the RB IDs for RB1 and RB2 to trusted subsystem 120. Access OFDM subsystem 110 schedules data1 using RB1 and responsively transfers data1 from access NET RCV receive buffer system 113 to access CPRI XMIT buffer system 111 and from access CPRI XMIT buffer system 111 to trust CPRI XMIT buffer system 121.

Hardware-trusted OFDM subsystem 120 schedules data2 using the RB2 and responsively transfers data2 from trust NET RCV buffer system 123 to trust CPRI XMIT buffer system 121. Hardware-trusted subsystem 120 determines a CPRI transmit sequence based on RB1 and RB2. The determination of the CPRI transmit sequence associates locations in trust CPRI XMIT buffer system 121 with CPRI transmit times based on: 1) an association of buffer 121 locations with their resident data1 and data2, 2) the association of data1 and data2 with RB1 and RB2, and 3) a time-alignment of RB1 and RB2 timing with the buffer 121 transmit times.

Hardware-trusted subsystem 120 transfers data1 and data2 from trust CPRI XMIT buffer system 121 to CPRI communication system 101 using the CPRI transmit sequence. CPRI communication system 101 receives data 1 and data2 from trusted subsystem 120. CPRI communication system 101 modulates, filters, amplifies, and wirelessly transfers data1 and data2 over the air. In some examples, trusted subsystem 120 encrypts data2 before transmission to CPRI system 101, and the user equipment receives and decrypts data2 after transmission from CPRI system 101.

Trusted OFDM subsystem 120 receives user service requests from the UEs or from network elements like a Mobility Management Entity (MME) or Service Gateway (S-GW). The user service request might be a wireless attachment, uplink bearer request, or the like. In response to the user service request, trusted subsystem 120 transfers an RB RQ to access subsystem 110. Access subsystem 110 receives the RB RQ and responsively retains OFDM RBs (RB3) to itself and allocates OFDM RBs (RB4) to the trusted OFDM subsystem 120. RB3 and RB4 are mutually exclusive.

Access subsystem 110 indicates the RB IDs for RB3 and RB4 to trusted subsystem 120. Access OFDM subsystem 110 schedules data3 using RB3. Trusted OFDM subsystem 120 schedules data4 using RB4. The individual RB allocations for RB3 and RB4 are signaled by subsystems 110 and 120 over CPRI communication system 101 to the UEs. Trusted OFDM subsystem 120 determines a CPRI receive sequence based on RB3 and RB4. The determination of the CPRI receive sequence associates locations in trust CPRI RCV buffer system 122 with CPRI receive times based a time-alignment of the OFDM times of RB3 and RB4 and the buffer location receive times. The determination of the CPRI receive sequence associates locations in trust CPRI RCV buffer system 122 with data3 and data4 based on: 1) the association of data3 and data4 with RB3 and RB4, 2) a time-alignment of the RB3 and RB4 timing with the buffer 122 receive times, and 3) an association of buffer 122 receive times with buffer 122 locations based on a buffer 122 location receive schedule.

CPRI communication system 101 wirelessly receives data3 and data4 from the UEs and transfers data3 and data4 to trusted OFDM subsystem 120. Trusted OFDM subsystem 120 receives data3 and data4 from CPRI communication system 101 into trust CPRI RCV buffer system 122. Trusted OFDM subsystem 120 transfers data3 from trust CPRI RCV buffer system 122 to access CPRI RCV buffer system 112 based on the CPRI receive sequence. Trusted OFDM subsystem 120 transfers data4 from trust CPRI RCV buffer system 122 to trust NET XMIT buffer system 124 based on the CPRI receive sequence.

Access OFDM subsystem 110 transfers data3 from access CPRI RCV buffer system 112 to access NET XMIT buffer system 114. Access OFDM subsystem 110 transfers data3 from access NET XMIT buffer system 114 to access communication network 130. Trusted OFDM subsystem 120 transfers data4 from trust NET XMIT buffer system 124 to trusted communication network 140.

Advantageously, the access and trusted subsystems share CPRI communication system 101, but trusted data2 and data4 never enter the access data communication subsystem 110.

In some examples, OFDM data communication system 100 comprises a Long Term Evolution (LTE) data communication system. For example, subsystems 110 and 120 may comprise different physical subsystems of an LTE eNodeB system. In some examples, subsystems 110 and 120 comprise a Network Function Virtualization Infrastructure (NFVI) executing Virtual Network Functions (VNFs) such as schedulers (vSCHEDs), Radio Resource Controllers (vRRCs), and the like. In some examples, subsystems 110 and 120 comprise Software-Defined Network (SDN) computer systems that execute SDN applications, SDN controllers, and SDN data-plane machines. Access communication network 130 may comprise a first OFDM core network and trusted communication network 140 may comprise a second OFDM core network where the first and second OFDM core networks are mutually exclusive.

OFDM data communication system 100 may comprise an NFV server system having first NFV time slices and second NFV time slices that are mutually exclusive. Trusted OFDM subsystem 120 might use the first NFV time slices and access OFDM subsystem 110 might use the second NFV time slices. In these NFV examples, CPRI XMIT buffer systems 111 and 121 may be physically the same with memory pointers and metadata passing across time and trust boundaries between subsystems 110 and 120. OFDM data communication system 100 may comprise an NFV server system having first NFV data processing cores and second NFV data processing cores that are mutually exclusive. Trusted OFDM subsystem 120 might use the first NFV data processing cores and access OFDM subsystem 110 might use the second NFV data processing cores.

Figure 2:
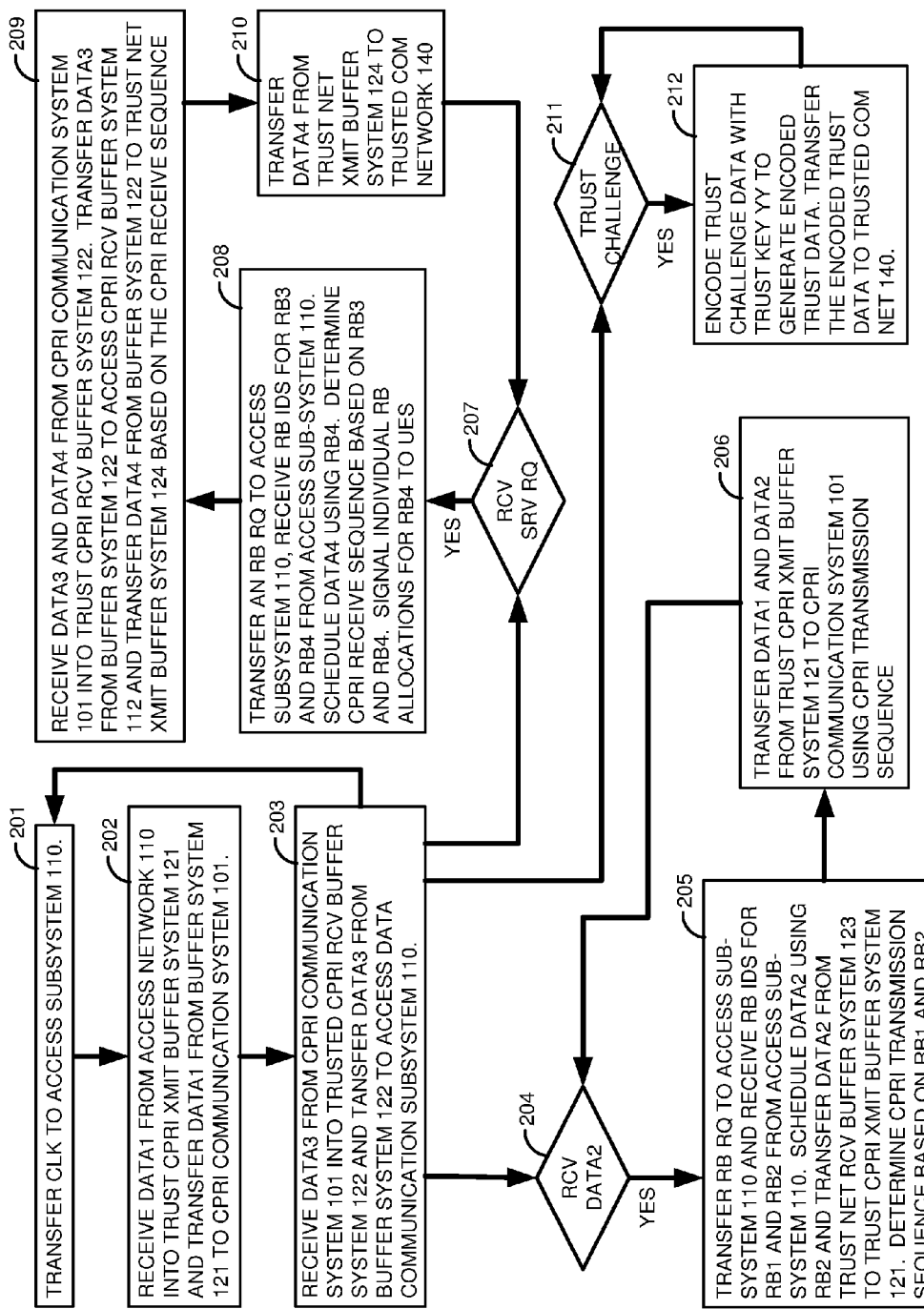
FIG. 2 illustrates the operation of a hardware-trusted OFDM subsystem to share a CPRI system with an access OFDM subsystem.

FIG. 2 illustrates the operation of hardware-trusted OFDM subsystem 120 to share CPRI system 101 with access OFDM subsystem 110. Hardware-trusted subsystem 120 transfers a timing signal (CLK) to access subsystem 110 (201). Hardware-trusted subsystem 120 receives data1 from access data communication network 110 into trust CPRI XMIT buffer system 121 and transfers data1 from buffer system 121 to CPRI communication system 101 (202). Trusted subsystem 120 receives data3 from CPRI communication system 101 into trusted CPRI RCV buffer system 122 and transfers data3 from buffer system 122 to access data communication subsystem 110 (203).

If trusted OFDM subsystem 120 receives data2 from trusted communication network 140 into trust NET RCV buffer system 123 (204), then trusted subsystem 120 transfers an RB RQ to access subsystem 110 (205). Trusted subsystem 120 then receives the RB IDs for RB1 and RB2 from access subsystem 110 (205). Trusted subsystem 120 schedules data2 using RB2 and transfers data2 from trust NET RCV buffer system 123 to trust CPRI XMIT buffer system 121 (205). Trusted subsystem 120 also determines a CPRI transmit sequence (205). The determination of the CPRI transmit sequence associates locations in trust CPRI XMIT buffer system 121 with CPRI transmit times based on: 1) an association of buffer 121 locations with their resident data1 and data2, 2) the association of data1 and data2 with RB1 and RB2, and 3) a time-alignment of RB1 and RB2 timing with the buffer 121 transmit times. Trusted subsystem 120 transfers data1 and data2 from trust CPRI XMIT buffer system 121 to CPRI communication system 101 using the CPRI transmit sequence (206).

If trusted subsystem 120 receives a Service Request (SRV-RQ) for the user (207), then trusted subsystem 120 transfers an RB RQ to access subsystem 110 and receives the RB IDs for RB3 and RB4 from access subsystem 110 (208). Trusted subsystem 120 schedules data4 using RB4 (208). Trusted OFDM subsystem 120 determines a CPRI receive sequence (208). The determination of the CPRI receive sequence associates locations in trust CPRI RCV buffer system 122 with data3 and data4 based on: 1) the association of data3 and data4 with RB3 and RB4, 2) a time-alignment of RB3 and RB4 timing with the buffer 122 receive times, and 3) an association of buffer 122 receive times with buffer 122 locations based on a buffer 122 location receive schedule.

Trusted subsystem 120 signals the individual RB allocations for RB4 over CPRI communication system 101 to the applicable UEs (208). Trusted OFDM subsystem 120 receives data3 and data4 from CPRI communication system 101 into trust CPRI RCV buffer system 122 (209). Trusted OFDM subsystem 120 transfers data3 from trust CPRI RCV buffer system 122 to access CPRI RCV buffer system 112 based on the CPRI receive sequence (209). Trusted OFDM subsystem 120 transfers data4 from trust CPRI RCV buffer system 122 to trust NET XMIT buffer system 124 based on the CPRI receive sequence (210). Trusted OFDM subsystem 120 transfers data4 from trust NET XMIT buffer system 124 to trusted communication network 140 (210).

If trusted subsystem 120 receives trust challenge data from trusted communication network 140 (211), then trusted subsystem 120 encodes the trust challenge data with its own physically-embedded trust key YY to generate encoded trust data (212). Trusted subsystem 120 transfers the encoded trust data to trusted communication network 140 (212).

Figure 3:
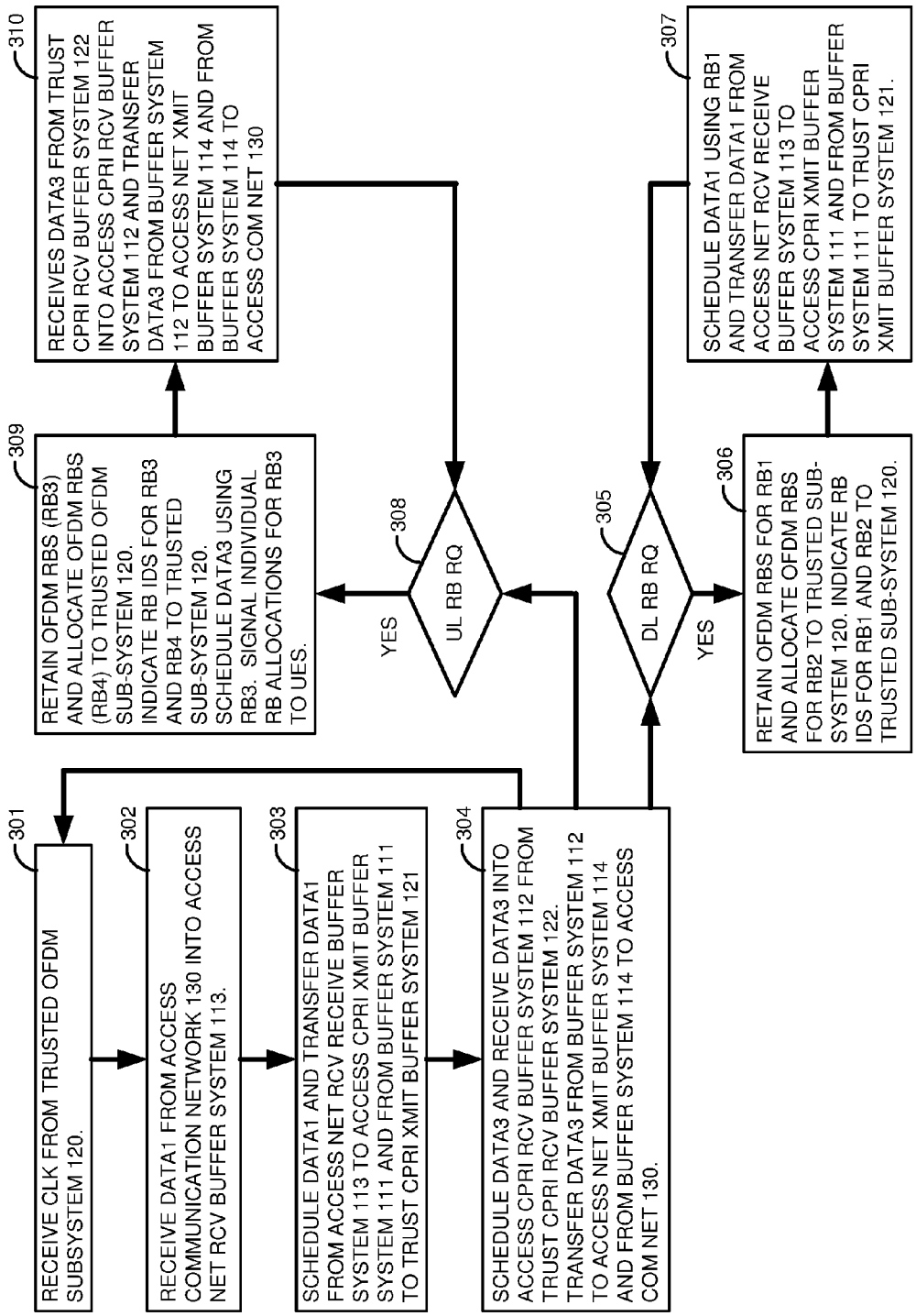
FIG. 3 illustrates the operation of an access OFDM subsystem to share a CPRI system with a trusted OFDM subsystem.

FIG. 3 illustrates the operation of access OFDM subsystem 110 to share CPRI system 101 with trusted OFDM subsystem 120. Access subsystem 110 receives the CLK from trusted OFDM subsystem 120 (301). Access OFDM subsystem 110 receives data1 from access communication network 130 into access NET RCV buffer system 113 (302). Access OFDM subsystem 110 schedules data1 and transfers data1 from access NET RCV receive buffer system 113 to access CPRI XMIT buffer system 111 and from access CPRI XMIT buffer system 111 to trust CPRI XMIT buffer system 121 (303). Access subsystem 110 schedules data3 and receives data3 into access CPRI RCV buffer system 112 from trust CPRI RCV buffer system 122 (304). Access subsystem 110 transfers data3 from access CPRI RCV buffer system 112 to access NET XMIT buffer system 114 and from access NET XMIT buffer system 114 to access communication network 130 (304).

If access subsystem 110 receives a Down-Link (DL) RB RQ from trusted subsystem 120 (305), then access subsystem 110 retains DL OFDM RBs for RB1 and allocates DL OFDM RBs for RB2 to trusted subsystem 120 (306). Access subsystem 110 indicates the RB IDs for RB1 and RB2 to trusted subsystem 120 (306). Access OFDM subsystem 110 schedules data1 using RB1 (307). Access subsystem 110 transfers data1 from access NET RCV receive buffer system 113 to access CPRI XMIT buffer system 111 and from buffer system 111 to trust CPRI XMIT buffer system 121 (307).

If access subsystem 110 receives an Up-Link (UL) RB RQ (308), then access subsystem 110 retains OFDM RBs (RB3) to itself and allocates OFDM RBs (RB4) to the trusted OFDM subsystem 120 (309). Access subsystem 110 indicates the RB IDs for RB3 and RB4 to trusted subsystem 120 (309). Access OFDM subsystem 110 schedules data3 using RB3 (309). Access subsystem 110 signals the individual RB allocations for RB3 over CPRI communication system 101 to the applicable UEs (309). Access subsystem 110 receives data3 from trust CPRI RCV buffer system 122 into access CPRI RCV buffer system 112 (310). Access subsystem 110 transfers data3 from access CPRI RCV buffer system 112 to access NET XMIT buffer system 114 (310). Access OFDM subsystem 110 transfers data3 from access NET XMIT buffer system 114 to access communication network 130 (310).

Figure 4:
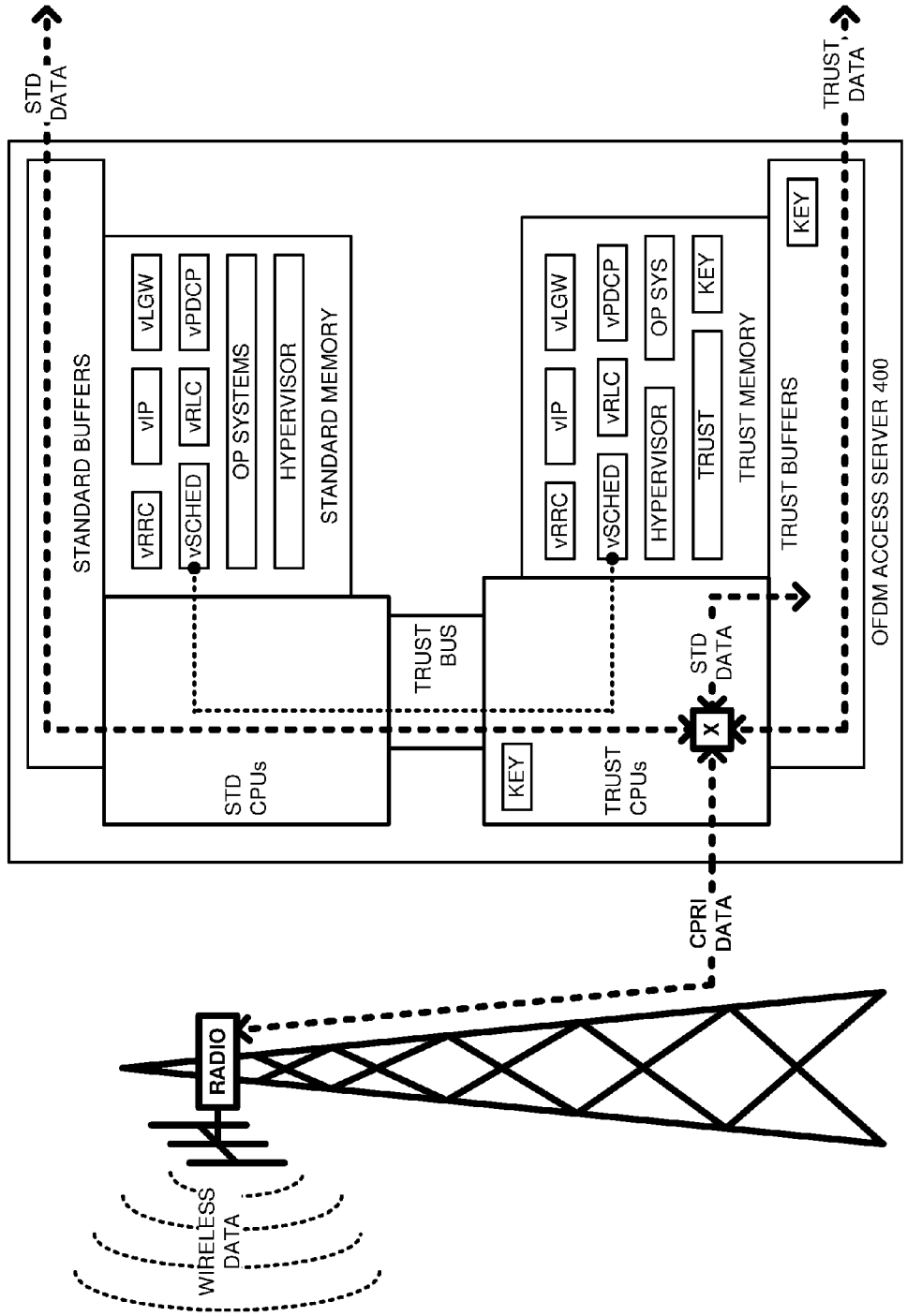
FIG. 4 illustrates an OFDM access server to share a CPRI system between OFDM subsystems.

FIG. 4 illustrates OFDM access server 400 to share a CPRI system between OFDM subsystems. OFDM access server 400 is an example of subsystems 110 and 120, although those systems may vary from this example. OFDM access server 400 is an eNodeB, picocell, or some other OFDM wireless access point. OFDM access server 400 comprises Central Processing Units (CPUs), memories and buffers, software, and a trust bus. These components are partitioned into a hardware-trusted zone and a standard zone. The software includes hypervisors and operating systems to support Network Function Virtualization (NFV). The software includes Virtual Network Functions (VNFs) like Internet Protocol processing (vIP), Local data Gateway (vLGW), resource block scheduler (vSCHED), Radio Resource Control (vRRC), Radio Link Control (vRLC), and Packet Data Convergence Protocol (vPDCP). In the hardware-trusted zone, the software includes trust software to drive the reading and hashing of hardware keys embedded in the CPUs, buffers and memories and to manage data transfers across the trust bus.

OFDM access server 400 exchanges standard data and trust data with other systems that are not shown. OFDM access server 400 exchanges CPRI data with a radio system on a tower. The CPRI data transports the standard data and the trust data. The radio performs modulation, amplification, filtering, beamforming, Multiple Input Multiple Output (MIMO), and the like. The radio drives an antenna system to exchange corresponding wireless data over the air. The wireless data transports the standard data and the trust data.

In OFDM access server 400, the standard CPUs read and execute the hypervisor, operating systems, and VNFs from the standard memory. Likewise, the trust CPUs read and execute the hypervisor, operating systems, and VNFs from the trust memory. The trust CPUs also read and execute the trust software. The VNFs drive the standard and trust CPUs to perform wireless access services for user equipment like attachment, registration, network signaling, scheduling, and data transfers.

In operation, the trust CPUs execute the trust software and receive trust challenge data in the CPRI data, trust data, or standard data. The trust CPUs execute the trust software to read the various physically-embedded hardware keys in the hardware-trusted partition, encode the trust challenge data with the keys into encoded trust data, and transfer the encoded trust data for remote hardware validation.

The standard buffers receive standard data from an access network. The trust buffers receive trust data from a trusted network. In response to receiving the trust data in the trust buffers, the trust CPUs and vSCHEDs transfer RB RQs to corresponding vSCHEDs in the standard partition. The standard CPUs and vSCHEDs receive the RB RQs and responsively retain a first set of OFDM RBs (RB1) and allocate a second set of RBs (RB2) to the trusted CPUs and their vSCHEDs. The standard CPUs and vSCHEDs indicate the RB IDs for RB1 and RB2 to the trusted CPUs and vSCHEDs. The standard CPUs and vSCHEDs schedule the standard data using RB1 and responsively transfer the scheduled standard data from the standard buffers to the trusted buffers through the trust bus and trusted CPUs.

The trusted CPUs and vSCHEDs schedule the trusted data using RB2. The trust CPUs and vSCHEDs determine a CPRI transmit sequence that associates trust buffer memory locations with CPRI transmit times. The trust CPUs and vSCHEDs transfer the standard data and the trusted data from the trusted buffers to the CPRI data interface using the CPRI transmit sequence.

For data communications in the other direction, the trust CPUs and VNFs, receive user service requests from user equipment, network controllers, gateways, and the like. In response to the user service requests, the trust CPUs and vSCHEDs transfer RB RQs to corresponding CPUs and vSCHEDs in the standard partition. The standard CPUs and vSCHEDs receive the RB RQs and responsively retain a third set of OFDM RBs (RB3) and allocate a fourth set of RBs (RB4) to the trusted CPUs and their vSCHEDs. The standard CPUs and vSCHEDs indicate the RB IDs for RB3 and RB4 to the trusted CPUs and vSCHEDs. The standard CPUs and vSCHEDs schedule the standard data using RB3 and the trusted CPUs and vSCHEDs schedule the trusted data using RB4. The trust CPUs and vSCHEDs determine a CPRI receive sequence that associates trust buffer memory locations with data3 and data4.

The trust CPUs and VNFs receive both the standard data and the trusted data from the CPRI data interface into the trusted buffers. Based on the CPRI receive sequence, the trust CPUs and VNFs transfer the standard data from the trust buffers to the standard buffers through the trust CPUS, trust bus, and standard CPUs. The standard CPUs and VNFs transfer the standard data from the standard buffers to other systems that are not shown. Based on the CPRI receive sequence, the trust CPUs and VNFs transfer the trust data from the trust buffers to other systems that are not shown.

Advantageously, the standard and trusted buffers share the CPRI data link to the radio system, but trusted data never enters the standard CPUs or buffers.

Figure 5:
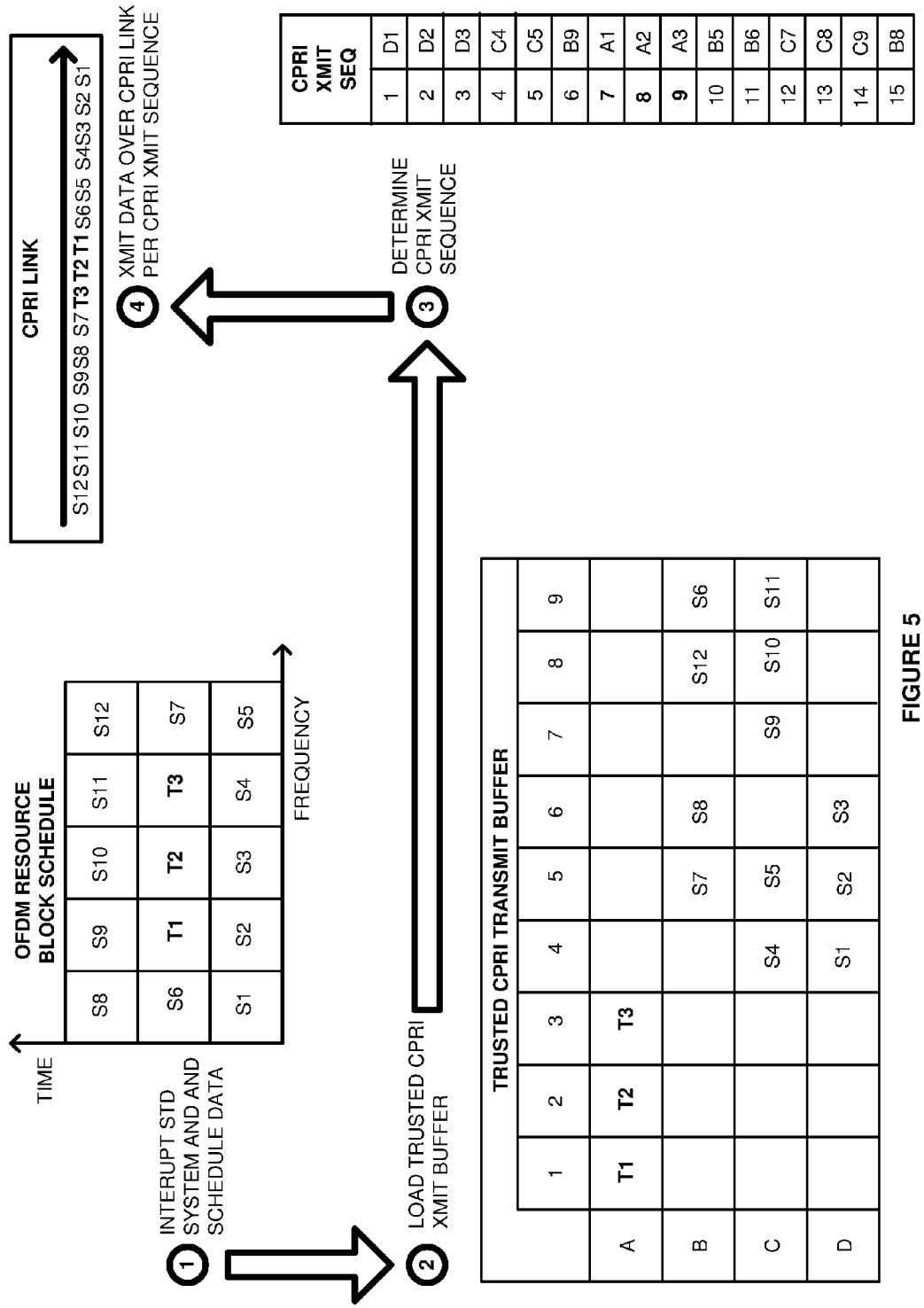
FIG. 5 illustrates a technical process to share a CPRI system between OFDM subsystems.

FIG. 5 illustrates a technical process to share a CPRI system between OFDM subsystems. In a first process, a trusted OFDM subsystem interrupts a standard OFDM subsystem to schedule a data transmission of trusted data T1, T2, and T3. The standard subsystem schedules T1-T3 and its own user data S1-S12 in OFDM RBs. In a second process, the trusted CPRI transmit buffer is loaded with the scheduled data T1-T3 and S1-S12. In this example, trusted data T1 is stored at buffer location A2 and standard data S8 is stored at buffer location B6. In a third process, the trusted subsystem determines a CPRI transmit sequence that associates CPRI transmit times 1-15 with trusted buffer locations A1-D9. The CPRI transmit sequence associates the trusted buffer locations with the CPRI transmit times based on: 1) the use of buffer locations A1-D9 by data T1-T3 and S1-S12, 2) the scheduling of data T1-T3 with the RBs for T1-T3 and of data S1-S12 with the RBs for S1-S12, and 3) a time-alignment of the RB transmit times with the buffer transmit times 1-15. In a fourth process, the trusted subsystem transmits the data over the CPRI link per the CPRI transmit sequence.

A reciprocal process for received data would determine a CPRI receive sequence that associates trusted buffer locations with received data. The association would link received data with their uplink RBs, align the uplink RB times with the trusted buffer receive times, and relate the trusted buffer receive times with the trusted buffer locations based on a buffer receive schedule. The trusted OFDM subsystem would receive trusted and standard data from the CPRI system and use the CPRI receive sequence to transfer the trusted and standard data to their respective OFDM subsystems.

Figure 6:
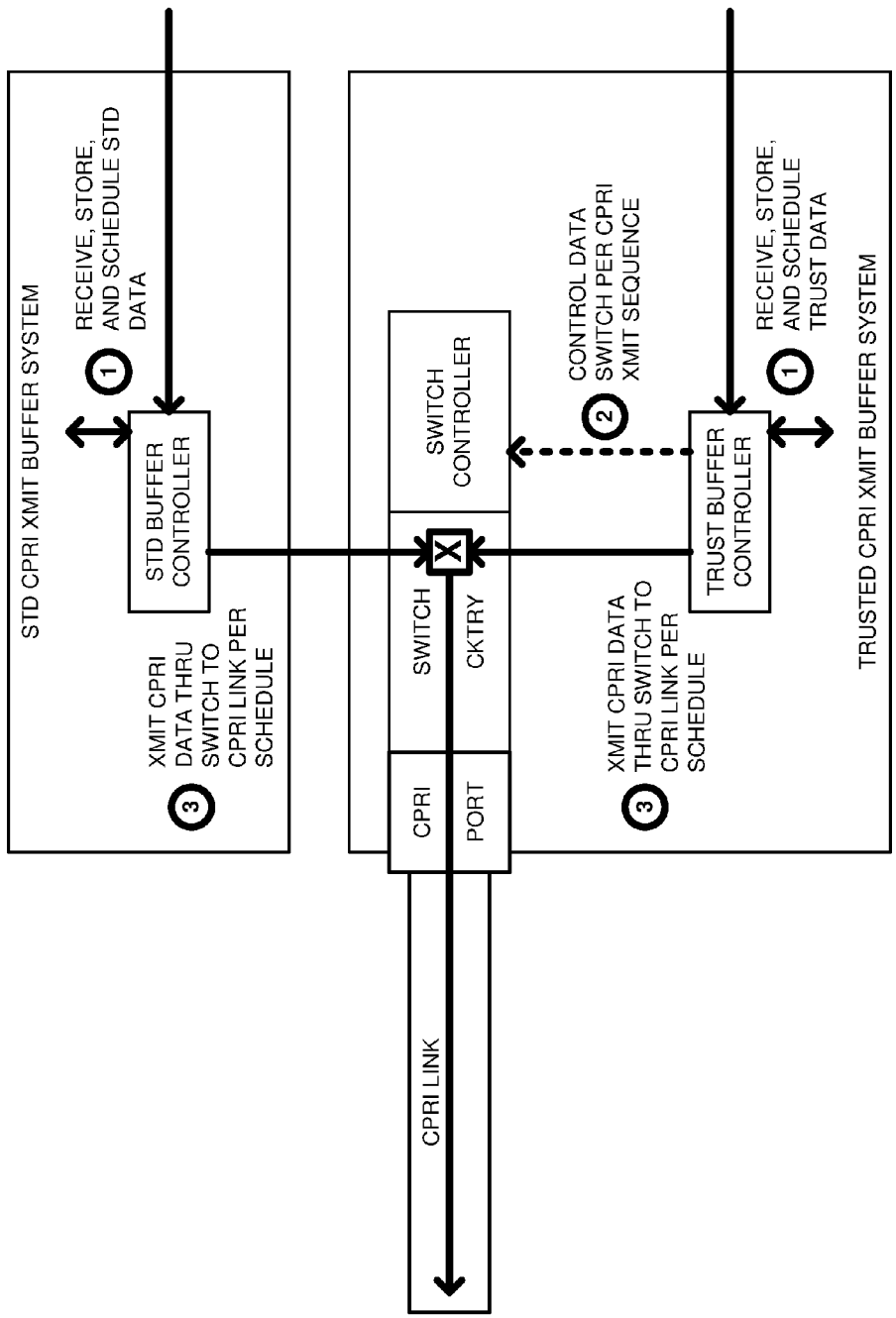
FIG. 6 illustrates a technical process to share a CPRI link between OFDM buffer systems.

FIG. 6 illustrates a technical process to share a CPRI link between OFDM buffer systems. In a first process, a standard CPRI transmit buffer controller receives and stores standard data in a standard CPRI XMIT buffer. Likewise, a trusted CPRI XMIT buffer controller receives and stores trusted data in a trusted CPRI XMIT buffer. The buffer controllers receive the CPRI transmit sequence from a trusted OFDM scheduler, where the trusted OFDM scheduler received an OFDM schedule from a standard OFDM scheduler. In a second process, the trusted buffer controller directs the data switch controller per the CPRI transmit sequence. The data switch controller then drives the switch circuitry. In a third process contemporaneous with the second process, the standard buffer controller transfers its standard data through the data switch in the trusted system to a CPRI port attached to a CPRI link per the CPRI transmit sequence. Likewise, the trusted buffer controller transfers its trusted data through the data switch to the CPRI port attached to the CPRI link per the CPRI transmit sequence.

A reciprocal process for received data uses a CPRI receive sequence to control the data switch. This CPRI receive sequence associates CPRI receive times with standard or trusted data based on the association of the data types with their uplink RBs and the RBs with their corresponding trusted buffer receive times. The standard buffer controller receives its standard data from the CPRI link through the data switch in the trusted system per the CPRI receive sequence. The trusted buffer controller receives its trusted data from the CPRI link through the data switch per the CPRI transmit sequence. Advantageously, the standard and trusted buffer systems share the CPRI link but trusted data never enters the standard buffer system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Orthogonal Frequency Division Multiplex (OFDM) data communication system comprising:
   a trusted OFDM subsystem receiving trust challenge data and responsively encoding the trust challenge data with a physically-embedded read-only trust key to generate encoded trust data and transferring the encoded trust data;
   the trusted OFDM subsystem receiving user data from a trusted communication network into a trusted network receive buffer system and responsively transferring a resource request to an access OFDM subsystem;
   the access OFDM subsystem receiving the resource request and allocating and indicating trusted OFDM resource blocks to the trusted OFDM subsystem;
   the trusted OFDM subsystem scheduling the user data using the trusted OFDM resource blocks and responsively transferring the user data from the trusted network receive buffer system to a trusted Common Public Radio Interface (CPRI) transmit buffer system; and
   the trusted OFDM subsystem transferring the user data from the trusted CPRI transmit buffer system to a CPRI communication system.

2. The method of claim 1 wherein the OFDM data communication system comprises a Network Function Virtualization (NFV) server system having trusted NFV time slices.

3. The method of claim 1 wherein the OFDM data communication system comprises a Network Function Virtualization (NFV) server system having trusted NFV time slices and the trusted OFDM subsystem uses the trusted NFV time slices.

4. The method of claim 1 wherein the OFDM data communication system comprises a Network Function Virtualization (NFV) server system having trusted NFV data processing cores.

5. The method of claim 1 wherein the OFDM data communication system comprises a Network Function Virtualization (NFV) server system having trusted NFV data processing cores and the trusted OFDM subsystem uses the trusted NFV data processing cores.

6. The method of claim 1 wherein the trusted OFDM subsystem encrypts the user data before transmission.

7. The method of claim 1 wherein the OFDM data communication system comprises an eNodeB data communication system.

8. The method of claim 1 wherein the trusted OFDM subsystem comprises an eNodeB data communication system.

9. The method of claim 1 wherein the access OFDM subsystem comprises an eNodeB data communication system.

10. The method of claim 1 wherein the OFDM data communication system comprises a Long Term Evolution (LTE) data communication system.

11. An Orthogonal Frequency Division Multiplex (OFDM) data communication system comprising:
    a trusted OFDM subsystem configured to receive trust challenge data and responsively encode the trust challenge data with a physically-embedded read-only trust key to generate encoded trust data and to transfer the encoded trust data;
    the trusted OFDM subsystem configured to receive user data from a trusted communication network into a trusted network receive buffer system and responsively transfer a resource request to an access OFDM subsystem;

the access OFDM subsystem configured to receive the resource request and allocate and indicate trusted OFDM resource blocks to the trusted OFDM subsystem;

the trusted OFDM subsystem configured to schedule the user data using the trusted OFDM resource blocks and responsively transfer the user data from the trusted network receive buffer system to a trusted Common Public Radio Interface (CPRI) transmit buffer system; and the trusted OFDM subsystem configured to transfer the user data from the trusted CPRI transmit buffer system to a CPRI communication system.

12. The OFDM data communication system of claim 11 wherein the OFDM data communication system comprises a Network Function Virtualization (NFV) server system having trusted NFV time slices.

13. The OFDM data communication system of claim 11 wherein the OFDM data communication system comprises a Network Function Virtualization (NFV) server system having trusted NFV time slices and the trusted OFDM subsystem is configured to use the trusted NFV time slices.

14. The OFDM data communication system of claim 11 wherein the OFDM data communication system comprises a Network Function Virtualization (NFV) server system having trusted NFV data processing cores.

15. The OFDM data communication system of claim 11 wherein the OFDM data communication system comprises a Network Function Virtualization (NFV) server system having trusted NFV data processing cores and the trusted OFDM subsystem is configured to use the trusted NFV data processing cores.

16. The OFDM data communication system of claim 11 wherein the trusted OFDM subsystem is configured to encrypt the user data before transmission.

17. The OFDM data communication system of claim 11 wherein the OFDM data communication system comprises an eNodeB data communication system.

18. The OFDM data communication system of claim 11 wherein the trusted OFDM subsystem comprises an eNodeB data communication system.

19. The OFDM data communication system of claim 11 wherein the access OFDM subsystem comprises an eNodeB data communication system.

20. OFDM data communication system of claim 11 wherein the OFDM data communication system comprises a Long Term Evolution (LTE) data communication system.

* * * * *